United States Patent
Thompson et al.

(10) Patent No.: US 11,476,937 B2
(45) Date of Patent: Oct. 18, 2022

(54) CATV DIGITAL TRANSMISSION WITH BANDPASS SAMPLING

(71) Applicant: ARRIS Enterprises LLC, Suwanee, GA (US)

(72) Inventors: Robert J. Thompson, Quakertown, PA (US); David C. Hartrum, Springfield, PA (US); Christopher Jeblonski, Hatboro, PA (US); Rudolph J. Menna, Harleysville, PA (US); John L. Moran, III, Millville, MA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/486,422

(22) Filed: Apr. 13, 2017

(65) Prior Publication Data

US 2017/0250754 A1 Aug. 31, 2017

Related U.S. Application Data

(62) Division of application No. 14/247,417, filed on Apr. 8, 2014, now Pat. No. 9,729,937.

(60) Provisional application No. 61/862,670, filed on Aug. 6, 2013.

(51) Int. Cl.
*H04B 10/2575* (2013.01)
*H04N 21/61* (2011.01)
*H04N 21/239* (2011.01)
*H04L 12/28* (2006.01)

(52) U.S. Cl.
CPC ... *H04B 10/25751* (2013.01); *H04L 12/2838* (2013.01); *H04N 21/239* (2013.01); *H04N 21/6118* (2013.01); *H04N 21/6168* (2013.01)

(58) Field of Classification Search
CPC ............ H04N 21/239; H04N 21/6119; H04N 21/6168
USPC .......................................................... 725/116
See application file for complete search history.

(56) References Cited

U.S. PATENT DOCUMENTS

| | | | | |
|---|---|---|---|---|
| 5,412,690 | A | * 5/1995 | Kotzin ................ | H03G 3/3052 370/484 |
| 5,903,705 | A | * 5/1999 | Yonemitsu ............ | G11B 19/12 348/E5.108 |
| 5,946,321 | A | * 8/1999 | Dean ...................... | H04L 12/46 370/403 |
| 6,211,926 | B1 | 4/2001 | Won | |
| 6,323,793 | B1 | 11/2001 | Howald et al. | |
| 9,729,937 | B2 | 8/2017 | Thompson | |
| 2002/0129379 | A1 | 9/2002 | Levinson et al. | |
| 2002/0188668 | A1* | 12/2002 | Jeffery ................ | H04M 11/062 709/203 |

(Continued)

OTHER PUBLICATIONS

E. Metz, et al., "Band Limited Port Aggregation in a Digital Return Path CATV System", May 2001, 4 pgs.

(Continued)

*Primary Examiner* — Nasser M Goodarzi
*Assistant Examiner* — Jaycee Imperial
(74) *Attorney, Agent, or Firm* — Chernoff, Vilhauer, McClung & Stenzel, LLP (57) ABSTRACT

Methods and systems capable of improving the transmission of data along an upstream path of a Hybrid Fiber-Coaxial Cable Network, from a transmitter in a node to a receiver in a Cable Modem Termination System.

8 Claims, 9 Drawing Sheets

(56) References Cited

U.S. PATENT DOCUMENTS

| | | | |
|---|---|---|---|
| 2003/0177502 A1* | 9/2003 | Kolze | H04N 21/6118 |
| | | | 725/111 |
| 2003/0223460 A1* | 12/2003 | Smith | H04H 60/96 |
| | | | 370/486 |
| 2007/0007959 A1 | 1/2007 | Szyperski | |
| 2008/0209478 A1* | 8/2008 | Santoru | H04H 20/12 |
| | | | 725/68 |
| 2010/0142951 A1* | 6/2010 | Armstrong | H04B 10/67 |
| | | | 398/65 |
| 2011/0185263 A1* | 7/2011 | Chapman | H04L 12/2801 |
| | | | 714/776 |
| 2011/0317177 A1 | 12/2011 | Kawatoko et al. | |
| 2011/0318012 A1 | 12/2011 | Lonn | |
| 2014/0137177 A1* | 5/2014 | Rakib | H04B 10/25751 |
| | | | 725/129 |
| 2014/0186041 A1 | 7/2014 | Shellhammer et al. | |
| 2014/0241167 A1 | 8/2014 | Hart et al. | |

OTHER PUBLICATIONS

Vaugh, Rodney G., et al., "The Theory of Bandpass Sampling", IEEE Transactions on Signal Processing, vol. 39, No. 9, Sep. 1991.

\* cited by examiner

CATV DIGITAL TRANSMISSION WITH BANDPASS SAMPLING

CLAIM FOR PRIORITY

This application is a Divisional of U.S. patent application Ser. No. 14/247,417 filed Apr. 8, 2014, which claimed priority to U.S. Provisional Application No. 61/862,670.

BACKGROUND

The present disclosure relates to systems and methods that provide video and data over a cable transmission network.

Figure 1:
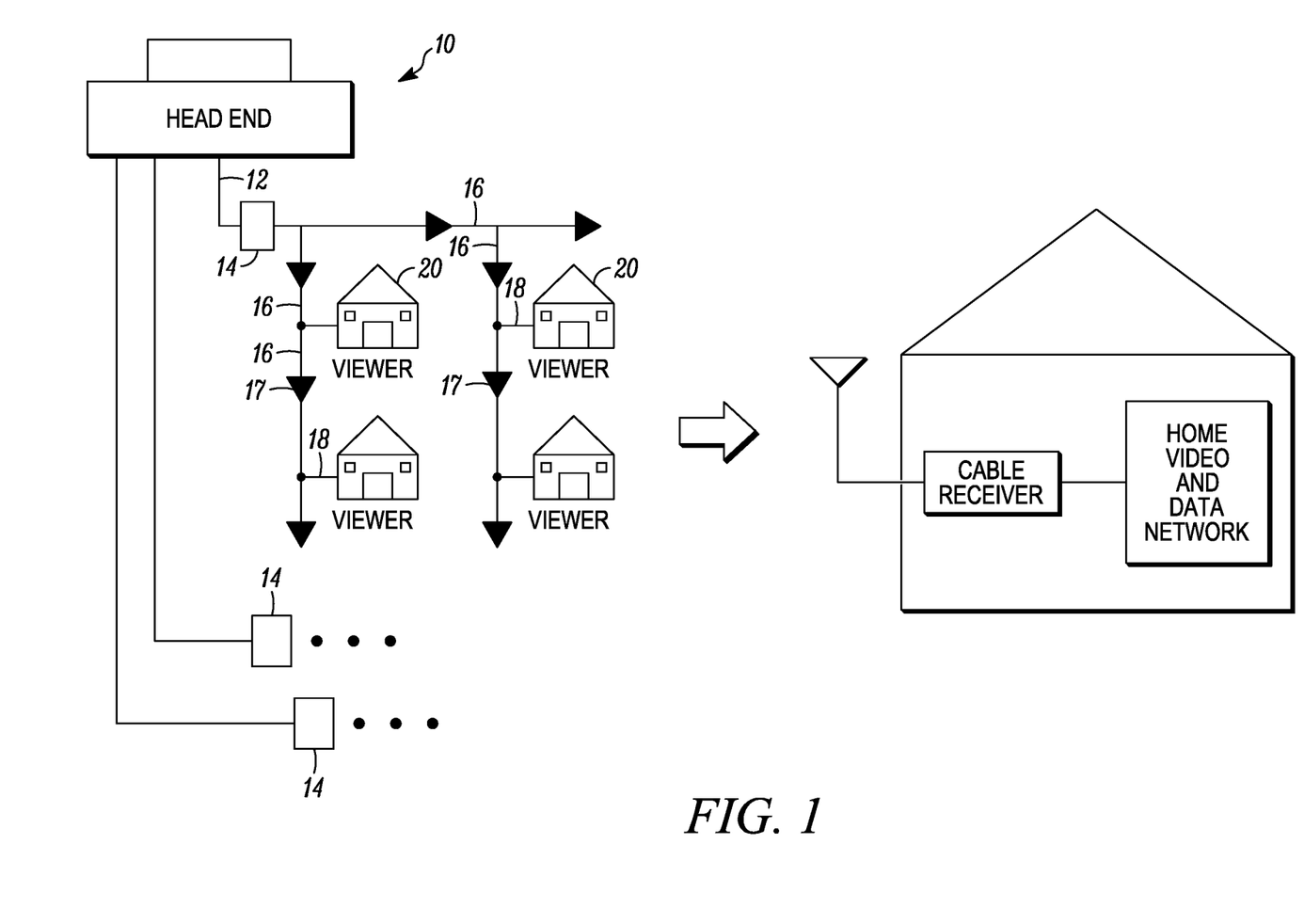
FIG. 1 shows an exemplary Hybrid/Fiber Coax CATV network including a head end that delivers CATV content to a plurality of homes.

Referring to FIG. 1, cable TV (CATV) systems were initially deployed as video delivery systems. In its most basic form the system received video signals at the cable head end, processed these for transmission and broadcast them to homes via a tree and branch coaxial cable network. In order to deliver multiple TV channels concurrently, early CATV systems assigned 6 MHz blocks of frequency to each channel and Frequency Division Multiplexed (FDM) the channels onto the coaxial cable RF signals. Amplifiers were inserted along the path as required to boost the signal and splitters and taps were deployed to enable the signals to reach the individual homes. Thus all homes received the same broadcast signals.

As the reach of the systems increased, the signal distortion and operational cost associated with long chains of amplifiers became problematic and segments of the coaxial cable were replaced with fiber optic cables to create a Hybrid Fiber Coax (HFC) network to deliver the RF broadcast content to the coaxial neighborhood transmission network. Optical nodes in the network acted as optical to electrical converters to provide the fiber-to-coax interfaces.

As the cable network evolved, broadcast digital video signals were added to the multiplexed channels. The existing 6 MHz spacing for channels was retained but with the evolving technology, each 6 MHz block could now contain multiple programs. Up to this point, each home received the same set of signals broadcast from the head end so that the amount of spectrum required was purely a function of the total channel count in the program line-up.

The next major phase in CATV evolution was the addition of high speed data service, which is an IP packet-based service, but appears on the HFC network as another 6 MHz channel block (or given data service growth, more likely as multiple 6 MHz blocks). These blocks use FDM to share the spectrum along with video services. Unlike broadcast video, each IP stream is unique. Thus the amount of spectrum required for data services is a function of the number of data users and the amount of content they are downloading. With the rise of the Internet video, this spectrum is growing at 50% compound annual growth rate and putting significant pressure on the available bandwidth. Unlike broadcast video, data services require a two-way connection. Thus, the cable plant had to provide a functional return path. Pressure on the available bandwidth has been further increased with the advent of narrowcast video services such as video-on-demand (VOD), which changes the broadcast video model as users can select an individual program to watch and use VCR-like controls to start, stop, and fast-forward. In this case, as with data service, each user requires an individual program stream.

Thus, the HFC network is currently delivering a mix of broadcast video, narrowcast video, and high speed data services. Additional bandwidth is needed both for new high definition broadcast channels and for the narrowcast video and data services. The original HFC network has been successfully updated to deliver new services, but the pressure of HD and narrowcast requires further change. The HFC network is naturally split into the serving areas served from the individual fiber nodes. The broadcast content needs to be delivered to all fiber nodes, but the narrowcast services need only be delivered to the fiber node serving the specific user. Thus, there is a need to deliver different service sets to each fiber node and also to reduce the number of subscribers served from each node (i.e. to subdivide existing serving areas and thus increase the amount of narrowcast bandwidth available per user).

FIG. 1 is a generalized representation of part of the cable TV infrastructure, which includes the cable head end; the Hybrid Fiber Coax (HFC) transmission network, and the home. The CATV head end receives incoming data and video signals from various sources (e.g., fiber optic links, CDN's, DBS satellites, local stations, etc.). The video signals are processed (reformatting, encryption, advertising insertion etc.) and packaged to create the program line up for local distribution. This set of video programs is combined with data services and other system management signals and prepared for transmission over the HFC to the home. All information (video, data, and management) is delivered from the head end over the HFC network to the home as RF signals. In the current practice, systems in the head end process the signals, modulate them to create independent RF signals, combine these into a single broadband multiplex, and transmit this multiplex to the home. The signals (different video channels and one or more data and management channels) are transmitted concurrently over the plant at different FDM frequencies. In the home, a cable receiver decodes the incoming signal and routes it to TV sets or computers as required.

Cable receivers, including those integrated into set-top boxes and other such devices, typically receive this information from the head end via coaxial transmission cables. The RF signal that is delivered can simultaneously provide a wide variety of content, e.g. high speed data service and up to several hundred television channels, together with ancillary data such as programming guide information, ticker feeds, score guides, etc. Through the cable receiver's output connection to the home network, the content is delivered to television sets, computers, and other devices. The head end will typically deliver CATV content to many thousands of individual households, each equipped with a compatible receiver.

Cable receivers are broadly available in many different hardware configurations. For example, an external cable receiver is often configured as a small box having one port connectable to a wall outlet delivering an RF signal, and one or more other ports connectable to appliances such as computers, televisions, and wireless routers or other network connections (e.g., 10/100/1,000 Mbps Ethernet). Other cable receivers are configured as circuit cards that may be inserted internally in a computer to similarly receive the signals from an RF wall outlet and deliver those signals to a computer, a television, or a network, etc. Still other cable receivers may be integrated into set-top boxes, such as the Motorola DCX3400 HD/DVR, M-Card Set-Top, which receives an input signal via an RF cable, decodes the RF signal to separate it into distinct channels or frequency bands providing individual content, and provides such content to a television or other audio or audiovisual device in a manner that permits users to each select among available content using the set top box.

As previously mentioned, the CATV transmission architecture has been modified to permit data to flow in both directions, i.e. data may flow not only from the head end to the viewer, but also from the viewer to the head end. To achieve this functionality, cable operators dedicate one spectrum of frequencies to deliver forward path signals from the head end to the viewer, and another (typically much smaller) spectrum of frequencies to deliver return path signals from the viewer to the head end. The components in the cable network have been modified so that they are capable of separating the forward path signals from the return path signals, and separately amplifying the signals from each respective direction in their associated frequency range.

The Hybrid/Fiber Coax (HFC) cable network architecture broadly depicted in FIG. 1 includes a head end system 10 having multiple devices for delivery of video and data services including EdgeQAMS (EQAMs) for video, cable modem termination systems (CMTS) for data, and other processing devices for control and management. These systems are connected to multiple fiber optic cables 12 that go to various neighborhood locations that each serve a smaller community. A fiber optic neighborhood or multi-neighborhood node 14 is located between each fiber optic cable 12 and a corresponding trunk cable 16, which in turn is interconnected to the homes 20 through drop cables 18 and feeder cables (not shown). Because the trunk cable 16, as well as the branch networks and feeder cables 18, each propagate RF signals using coaxial cable, the nodes 14 convert the optical signals to electrical signals that can be transmitted through a coaxial medium, i.e. copper wire. Similarly, when electrical signals from the home reach the node 14 over the coaxial medium, those signals are converted to optical signals and transmitted across the fiber optic cables 12 back to the systems at the head end 10. The trunk cables 16 and/or feeder cables 18 may include amplifiers 17. Connected to each trunk cable 16 is a branch network that connects to feeder cables (or taps) that each enter individual homes to connect to a respective cable receiver.

Hybrid fiber/coax networks generally have a bandwidth of approximately 750 MHz or more. Each television channel or other distinct content item transmitted along the forward path from the head end to a user may be assigned a separate frequency band, which as noted earlier has a typical spectral width of 6 MHz. Similarly, distinct content delivered along the return path from a user to the head end may similarly be assigned a separate frequency band, such as one having a spectral width of 6.4 MHz. In North America, the hybrid fiber/coax networks assign the frequency spectrum between 5 MHz and 42 MHz to propagate signals along the return path, and assign the frequency spectrum between 50 MHz and 750 MHz or more to propagate signals along the forward path.

Figure 2:
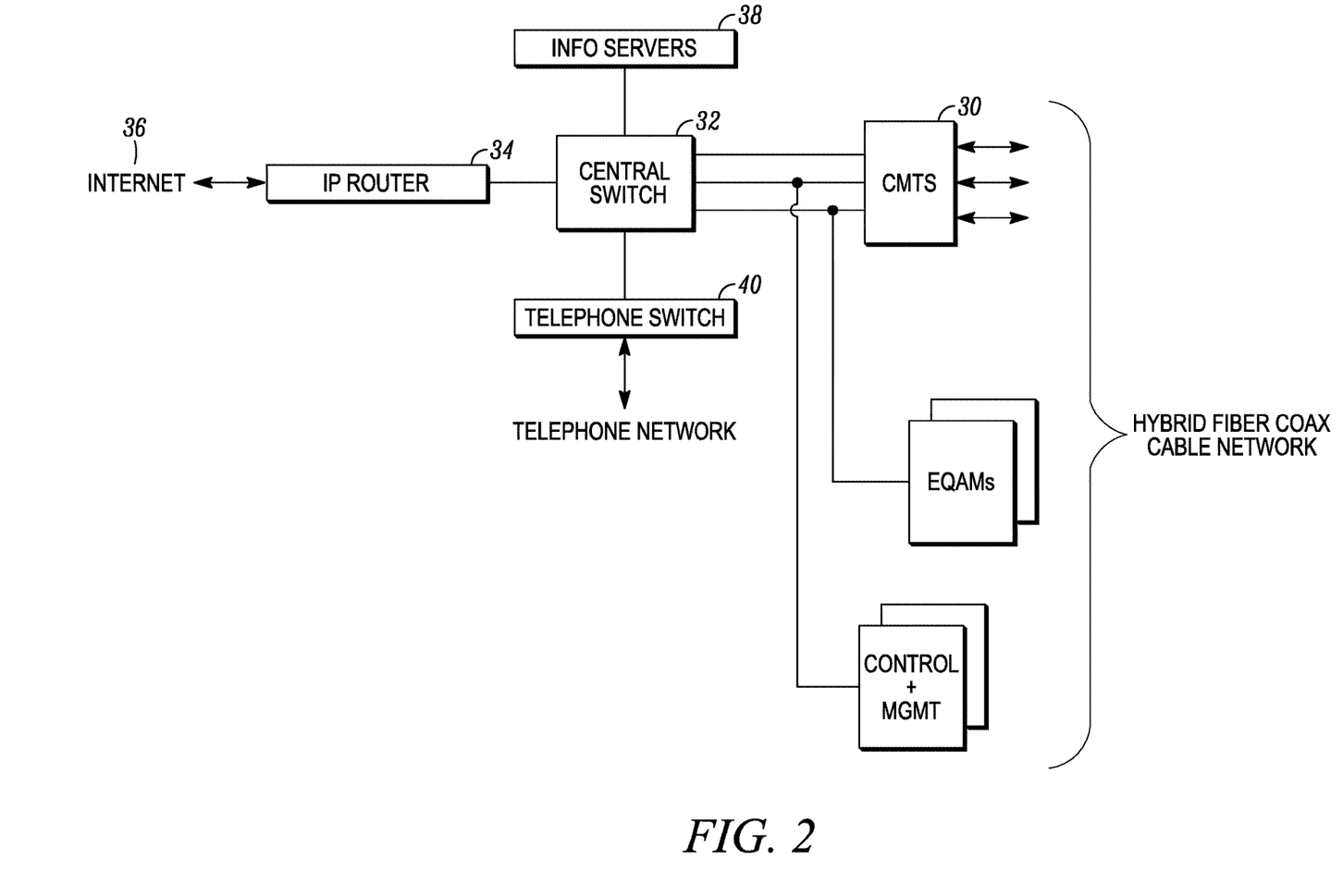
FIG. 2 shows an exemplary architecture of a head end, such as the ones shown in FIG. 1.

Referring to FIG. 2, a cable modem termination system (CMTS) 30 may be installed at the head end, which instructs each of the cable modems when to transmit return path signals, such as Internet protocol (IP) based signals, and which frequency bands to use for return path transmissions. The CMTS 30 demodulates the return path signals, translates them back into (IP) packets, and redirects them to a central switch 32. The central switch 32 redirects the IP packets to an IP router 34 for transmission across the Internet 36, and to the CMTS which modulates forward path signals for transmission across the hybrid fiber coax cables to the user's cable modem. The central switch 32 also sends information to, and receives information from, information servers 38 such as video servers. The central switch 32 also sends information to, and receives information from, a telephone switch 40 which is interconnected to the telephone network 42. In general, cable modems are designed to only receive from, and send signals to, the CMTS 30, and may not communicate directly with other cable modems networked through the head end.

Figure 3:
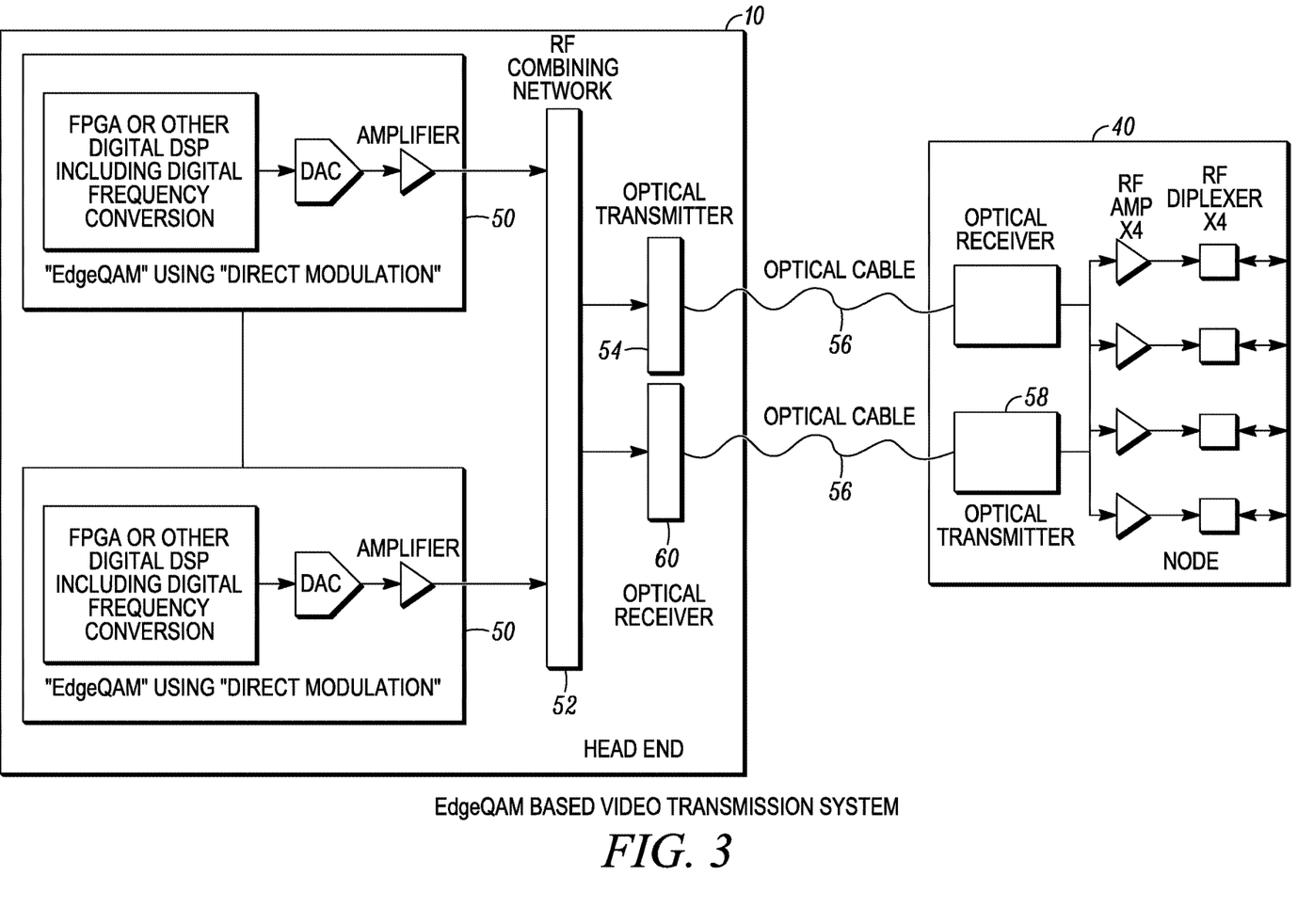
FIG. 3 shows an exemplary EdgeQAM architecture for a head end to communicate with a node along a forward path to deliver CATV content over a network.

FIG. 3 shows an exemplary architecture for delivering CATV content between a head end 10 to a node 14. The head end 10 may in some instances include a plurality of direct modulation EdgeQAM units 50 which each receive digitally encoded video signals, audio signals, and/or IP signals, and each directly outputs a spectrum of amplitude-modulated analog signal at a defined frequency or set of frequencies to an RF combining network 52, which in turn combines the received signals. An optical transmitter 54 then sends the entire spectrum of the multiplexed signals as an analog transmission through an optical fiber network 56 along a forward path to the node 14. The fiber optic network, as will be explained in more detail later, is also capable of conveying optical signals from the node 14 to the head end 10 via an optical path between a transmitter 58 in the node 14 and a receiver 60 in the head end. In the specification, the drawings, and the claims, the terms "forward path" and "downstream" may be interchangeably used to refer to a path from a head end to a node, a node to an end-user, or a head end to an end user. Conversely, the terms "return path", "reverse path" and "upstream" may be interchangeably used to refer to a path from an end user to a node, a node to a head end, or an end user to a head end. Also, it should be understood that, unless stated otherwise, the term "head end" will also encompass a "hub," which is a smaller signal generation unit downstream from a head end, often used for community access channel insertion and other purposes, that generally mimics the functionality of a head end, but may typically not include equipment such as satellite dishes and telephone units. Hubs are commonly known to those skilled in the art of the present disclosure. It should be understood that although FIG. 3 illustrates a head end 10 that utilizes direct modulation EdgeQAMs, other architectures may employ other modulators, such as an analog EdgeQAM modulator or a Converged Cable Access Platform (CCAP) modulation system.

Directly-modulated EdgeQAM units have become increasingly sophisticated, offering successively higher densities, which in turn means that each EdgeQAM unit can process more channels of CATV data. For example, modern EdgeQAM modulation products can now simultaneously generate 32 or more channels on a single output port. With more channels being modulated per output port, the amount of combining required by the RF combining network 52 is reduced, with a corresponding simplification in the circuitry at the head end. The term 'QAM' is often used to interchangeably represent either: (1) a single channel typically 6 MHz wide that is Quadrature Amplitude Modulated (thus a "32 QAM system" is shorthand for a system with 32 Quadrature Amplitude Modulated channels; or (2) the depth of modulation used by the Quadrature Amplitude Modulation on a particular channel, e.g. 256 QAM means the signal is modulated to carry 8 bits per symbol while 4096 QAM means the signal is modulated to carry 12 bits per symbol. A higher QAM channel count or a higher QAM modulation means that a higher number of content "channels" can be delivered over a transmission network at a given standard of quality for audio, video, data, etc. QAM channels are constructed to be 6 MHz in bandwidth in North America, to be compatible with legacy analog TV channels and other existing CATV signals. However, more than one video program or cable modem system data stream may be digitally encoded within a single QAM channel. The term channel is unfortunately often used interchangeably, even though a QAM channel and a video program are not often the same entity—multiple video programs can be and usually are encoded within a single 6 MHz QAM channel. In this case, the modern EdgeQAM modulation products generate multiple instances of the 6 MHz bandwidth QAM channels. This simplifies the head end structure since some subset of the RF combining is now performed within the EdgeQAM units rather than in the external RF combining network. Packaging multiple QAM generators within a single package also offers some economic value.

As noted previously, modern CATV delivery systems over an HFC network provides content that requires communication along both a forward path and a return path, and over time, the quantity and quality of data transmission along each of these paths has increased drastically, which can be seen for example in the evolution of the DOCSIS standard from its original 1.0 release to the impending 3.1 release.

DOCSIS (Data Over Cable Service Interface Specifications) was developed by a consortium of companies, including Cable Labs, ARRIS, Cisco, Motorola, Netgear, and Texas Instruments, among others. The first specification, version 1.x, was initially released in March 1997 and called for a downstream throughput of approximately 43 Mbps and an upstream throughput of approximately 10 Mbps along a minimum of one channel. DOCSIS 2.0, released in late 2001 increased the maximum upstream throughput to approximately 31 Mbps, again for a minimum of one channel. DOCSIS 3.0, released in 2006 required that hardware be able to support the DOCSIS 2.0 throughput standards of 43 Mbps and 31 Mbps, respectively, along minimum of four channels in each direction. The DOCSIS 3.1 platform is aiming to support capacities of at least 10 Gbps downstream and 1 Gbps upstream using 4096 QAM. The new specification aims to replace the 6 MHz downstream and 6.4 MHz upstream wide channel spacing with smaller 25 kHz to 50 kHz orthogonal frequency division multiplexing (OFDM) subcarriers, which can be bonded inside a block spectrum that could end up being about 192 MHz wide for downstream and 96 MHz for upstream.

Providing increasing throughput along the upstream path has been particularly problematical the presence of upstream impairments including ingress. Ingress is radio frequency (RF) energy that has varying bandwidth and RF levels and can enter the CATV upstream plant via cable network defects. CATV network defects may include loose or corroded connectors, unterminated ports, and damaged cables, for example. Thus, to continue to meet the evolving needs of delivering CATV content, improved techniques for transmission along the upstream path, and particularly in the presence of upstream impairments. are desirable.

DETAILED DESCRIPTION

Figure 4:
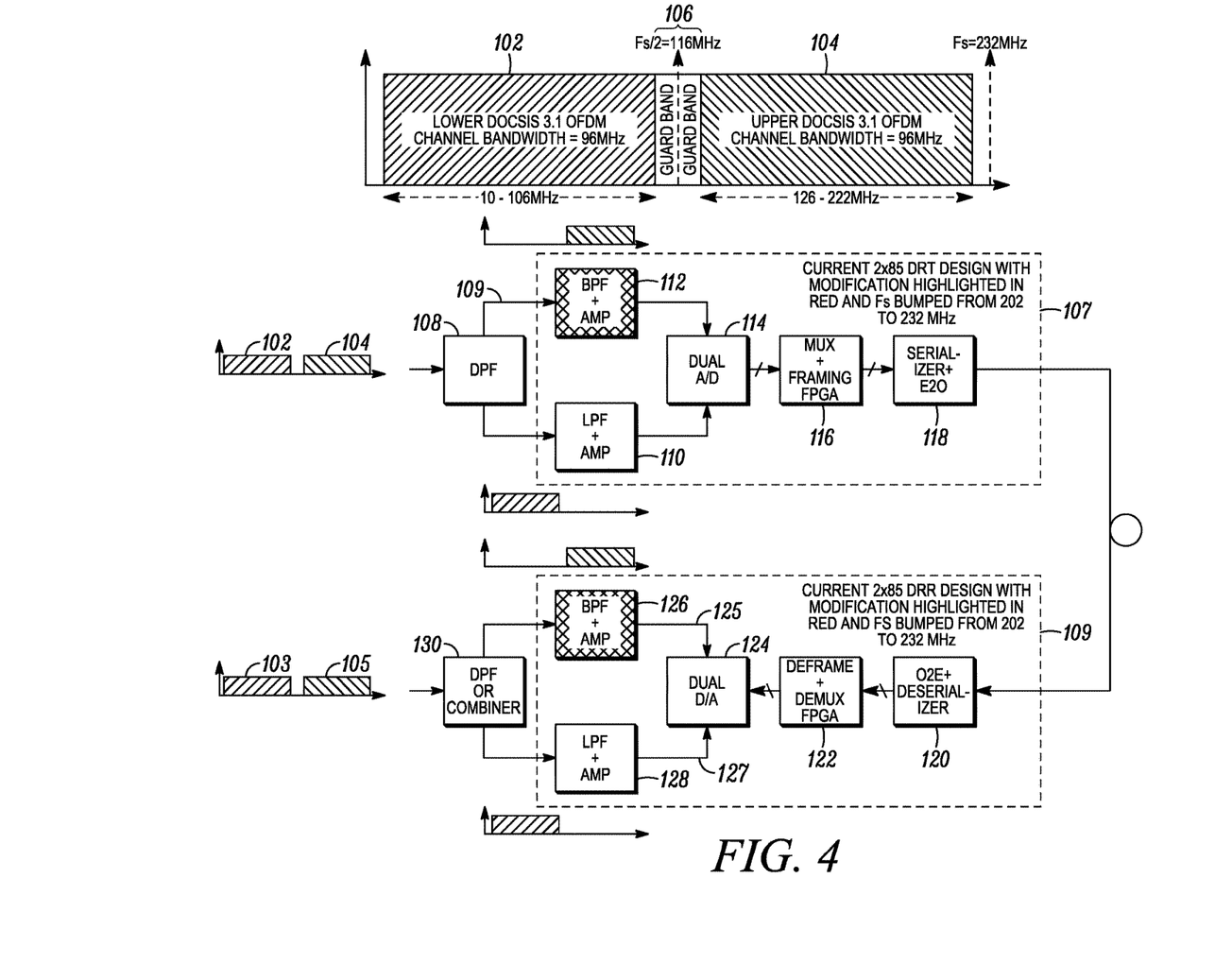
FIG. 4 shows an example of an upstream transmission system according to one aspect of the present disclosure.

FIG. 4 generally illustrates an improved system for transmitting data along a return path from a Digital Return Transmitter (DRT) 107, in a node for example, to a Digital Return Receiver (DRR) 109 in a head end, for example. Specifically, FIG. 4 shows a DRT 107 receiving two signals 102 and 104 for transmission to the DRR 109. Future DOCSIS channels may occupy a maximum bandwidth of 96 MHz, approximately 15 times larger than the largest upstream DOCSIS 3.0 channel, where each of the signals 102 and 104 can generate a digital signal rate anywhere in the range of 800 Mbps to 2.25 Gbps depending on the signal band, sampling rate and the number of bits used to sample each signal. Even when digitizing only two of these signals, and transmitting them both together using time division multiplexing of the digital signals, the aggregated digital signal rate may exceed the capabilities of existing digital and optical transport platforms.

The system of FIG. 4, however, permits the signals 102 and 104 to be simultaneously transmitted using existing architectures by taking advantage of the principles of bandpass sampling. Ordinarily, the Nyquist sampling theorem dictates that in order to completely preserve the information in a transmitted signal occupying a limited portion of the frequency spectrum, the signal must be sampled at a rate equal to twice the upper frequency limit of the signal. For example, if the maximum frequency of the signal is 100 MHz, the signal must be sampled at 200 million samples per second in order to preserve all the information in the signal. At even modest symbol bit rates of say six to eight bits per sample, the required throughput to sample at the full Nyquist rate can become significant.

Figure 5:
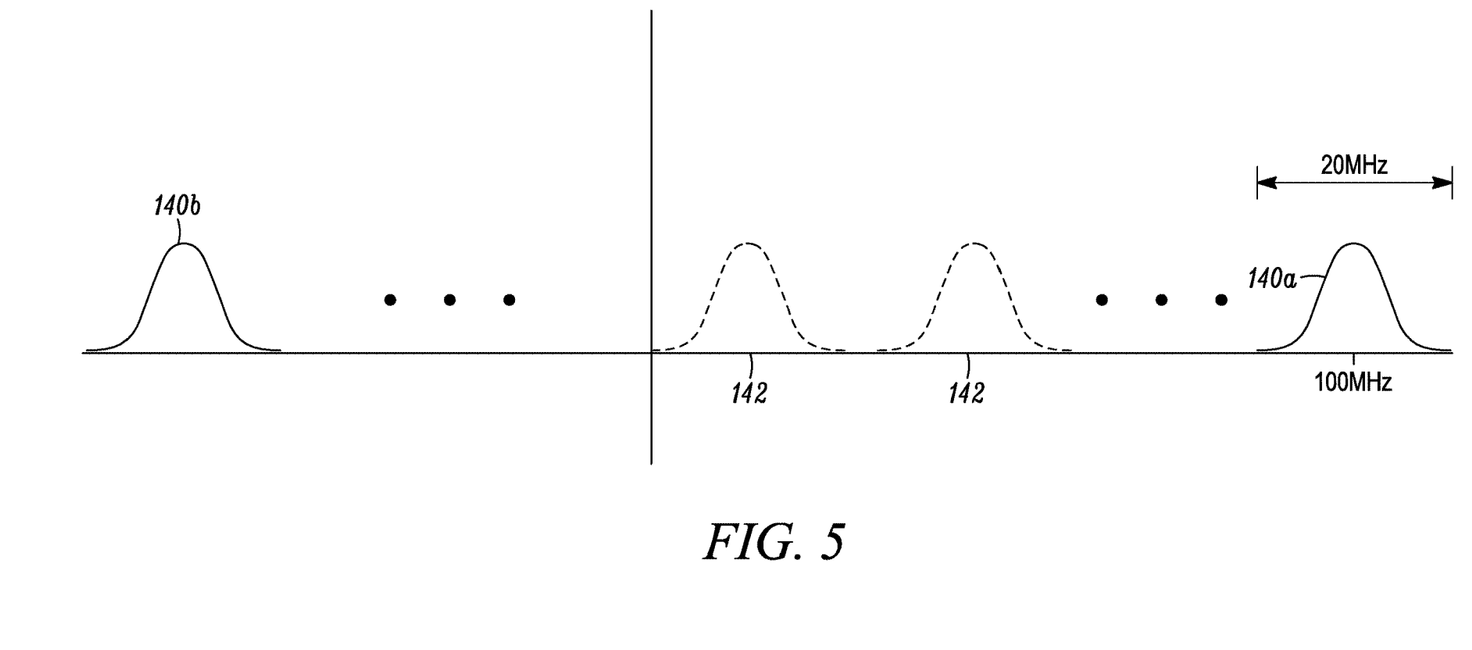
FIG. 5 shows a band-limited signal capable of being sampled at a rate of less than twice its upper cutoff frequency while still preserving all its information.

FIG. 5, however, illustrates a circumstance in which all information in a transmitted signal may be preserves without sampling at the rate of twice the upper cutoff frequency of the signal. Specifically, a signal 140$a$, 140$b$ may be bandlimited to a 20 MHz segment of the frequency spectrum from plus or minus 90 MHz to plus or minus 110 MHz. It will be understood by those skilled in the art that the signal need only be sampled on the positive sideband, as the negative sideband is simply a mirror image of the positive sideband. FIG. 5 also shows spectral aliases 142 of the signal 140$a$ that extend from the baseband to the signal component 140$a$. Stated differently, a theoretical repeating signal occupying a single frequency on the spectrum at 100 MHz, thus repeating 100 million times per second, has a spectral alias occurring at every 1 Hz interval. By extension, the signal 140$a$ has spectral aliases 142 that begin at baseband and repeat at every integral multiple of the width of the signal 140$a$. If signal 140$a$ is located on the spectrum at an integral multiple of its width, the spectral aliases do not overlap, and thus the signal 140$a$ may be fully sampled by sampling its baseband spectral alias only, i.e. by sampling at a rate of twice the spectral width signal 140a rather than twice its upper cutoff frequency. If the signal 140a is located on the spectrum at a position that is not an integral multiple of its width, the spectral aliases will overlap, but the signal 140a may be fully sampled by sampling at a rate that is greater than twice its spectral width, but still much less than twice its upper cutoff frequency.

As noted previously, existing hybrid fiber coax architectures include components that would ordinarily be considered as lacking the capability of processing two or more signals 102 and 104 sequentially positioned on the frequency position, if those signals conformed to anticipated future DOCSIS standards. The present inventors realized, however, that by taking advantage of bandpass sampling principles, existing architectures could be modified without the need to upgrade much of the equipment in existing architectures.

Referring again to FIG. 4, the disclosed system may preferably sample and transmit plural wideband orthogonal frequency division multiple access (OFDM) channels 102 and 104, each with up to 96 MHz BW. It should be understood, however, that other embodiments may simultaneously transmit more than two OFDM channels, such as four channels for example. guardband 106 between channels may be included to prevent interference between the channels. In this example, a fully loaded DOCSIS return may require an upper frequency of >200 MH, e.g. a lower OFDM channel 102 from 10-106 MHz and a upper OFDM channel 104 from 126-222 MHz. To digitize the continuous band from 0 to 222 MHz, the sampling rate would need to be >444 Msps (likely ~510 Msps), well in excess of devices used in current 2×85 digital return.

A DRT 107 may first filter the signals 102 and 104 with a diplex filter 108 that separates the signals 102, 104 into a first transmission path 109 for the signal 104 and a second transmission path 111 for the signal 102. The diplex filter preferably splits the signals 102 and 104 at a split frequency of approximately 116 MHz. The term "approximately in this context means anywhere within a range of 106 MHz to 126 MHz, on the assumption that each of the signals 102 and 104 are about 96 MHz in width and the guardband is about 20 MHz in width. Alternative embodiments may use a split frequency outside of this range, however, depending on the width of the signals 102 and 104. The signal 102 is preferably filtered by a low pass filter 110 while the signal 104 is preferably filtered by a bandpass filter 112. Preferably, each signal 102 and 104 may be amplified after being respectively filtered. The bandpass filter 112 is preferably configured to pass a range of frequencies that closely matches the frequency bounds of the signal 104, and to filter out all other frequencies. After each signal 102, 104 is filtered by a respective one of the filters 110 and 112, the signals 102 and 104 are converted to a digital signal by a dual A/D converter 114. The dual A/D converter 114 can be operated with independent analog inputs and/or can be used for diversity reception of signals, operating identically on the same carrier but from separate antennae. The output from the dual A/D converter 114 is input to a multiplexer 116, a device that selects one of several analog or digital input signals and forwards the selected input into a single line.

As can be seen in FIG. 4, between signal 102 and signal 104 is a guardband 106, which accounts for the fact that the diplex filter 108 has a significant cross-over region, in which frequencies above the lowpass portion of the diplex filter get passed, and frequencies below the highpass portion of the diplex filter get passed. The guardband, though necessary to protect the integrity of the respective signals 102 and 104, contains no data, hence the present inventors recognized that there is no reason for sampling frequencies within the guardband. Thus, the dual A/D converter is preferably configured to only sample the respective bands occupied by the signals 102 and 104, and without sampling the frequencies that occupy the guardband.

As can easily be recognized, by using bandpass filter 112 in conjunction with the disclosed dual A/D converter 114, a signal with bandwidth of 96 MHz can be sampled at >192 Msps (likely ~232 Msps), close to the current 2×85 sampling rate of 202 Msps. Thus, the use of bandpass sampling transforms the 2×85 Digital Return into a 1×200+ Digital Return. The use of digitized blocks to leverage the DSP concept of bandpass sampling may achieve strict Nyquist compliance, aggregating the signals on the receive end.

In some embodiments, a single hardware design can support both 2×85 MHz and 1×200+MHz. Thus, one hardware design can support both 2×85 MHz and 1×200+MHz, avoiding a total re-design of the 2×85 MHz legacy designs, which would be more complex and costly. In the DOCSIS digital return implementation shown in FIG. 4, an increase in current digital processing rates, e.g., from 202 to 232 Msps, supports the two (2) 96 MHz bandwidth channels 102 and 104. For example, one of the current time-division multiplexing (TDM) channels may carry the lower 96 MHz DOCSIS 3.1 channel 102 via conventional lowpass sampling, such as via low pass filter 110. The second of the TDM channels may carry the upper 96 MHz DOCSIS 3.1 channel 104 via bandpass sampling using bandpass filter 112.

As shown in FIG. 4, by bandpass sampling the advanced signaling on a DOCSIS channel, ingress impairments may be filtered out from the optical transmission path, since the filter characteristics are closely matched to the advanced signaling channel, e.g. the 96 MHz orthogonal frequency division multiple access (OFDMA signal) proposed by the DOCSIS 3.1 standard.

Preferably, the bandpass filter characteristics closely match the advanced signaling channel (or channels), thereby filtering out ingress impairments from the optical transmission path. Thus, the disclosed techniques may address modern cable upstream issues in a more economical manner than existing architectures. For example, in a Data Over Cable Service Interface Specifications (DOCSIS) implementation, the disclosed techniques may enable DOCSIS over extended splits by using the relationship between the state of the art in upstream digital return products (2×TDM @ 85 MHz split) and newly defined upstream approaches, e.g., using 2×96 MHz bands of OFDMA.

It should be understood that other center frequencies, bandwidths, and aggregation schemes can be chosen to provide desired performance. For example, if a signal band is not completely full, all the dynamic range (sampling rate) can be given to the occupied bandwidth to achieve a better SNR ratio. Similar techniques can be used to protect dynamic range and/or avoid overdrive due to regions of significant interference and ingress that are unoccupied with desired signals, such as the low end of the upstream band, or perhaps the FM band when upstream signal capacity is extended even further beyond DOCSIS 3.1.

Also, the disclosed techniques apply to any future extension of upstream bandwidth capacity—the tradeoff between full band digitization, processing, and transport versus aggregated spectrum increments. While the summation of summing spectrum segments to a total bandwidth is linear, the implementation costs of summing spectrum components that match a full single bandwidth approach may not be linear.

The multiplexer 116 may combine several input signals into one output signal, which carries several communication channels. The multiplexer 116 may increase the amount of data that can be sent over the channel within a certain amount of time and bandwidth. The multiplexer 116 makes it possible for the bandpass filter and low pass filter to share the Dual A/D 114. The MUX and Framing FPGA 116 may provide the output to a serializer and Electrical-to-Optical (E2O) converter 118.

A Digital Return Receiver (DRR) 109 may included an Optical-to-Electrical (O2E) converter and deserializer component 120 that provides an output to a deframe and demultiplexer FPGA 122. The demultiplexer 122 may take a single input signal and select one of many data output-lines connected to a single input. The demultiplexer 122 may take a single input signal that carries many channels and separate those over multiple output signals for delivery to a Dual A/D converter 124, where a demultiplexed first output signal 125 can be delivered to a bandpass filter 126 and a second output signal 127 is provided to a low pass filter 128. The signals 125 and 127 may be combined by a diplex filter/combiner 130 to re-create the original signals 102 and 104.

The center frequencies and bandwidths described herein are non-limiting examples of trading between full band digitization, processing and transport vs. the disclosed aggregated spectrum increments. For example, other center frequencies and bandwidths and aggregation schemes can be chosen to achieve this result to provide other performance advantages. In particular, for example, if the band is not completely full, all of the dynamic range can be given to the occupied BW to optimize performance (better SNR). This same mechanism also can be used to protect the dynamic range and/or avoid overdrive due to regions of significant interference and ingress that are unoccupied with desired signals, such as the low end of the upstream band or perhaps the FM band when the upstream is extended such as is anticipated by this disclosure.

Further, the disclosed concepts of separately digitizing single channels applies to future upstream bandwidth and recognizes the tradeoff between full band digitization, processing, and transport vs. aggregated spectrum increments. While the algebra of summing spectrum segments to a total BW required is linear, the implementation costs of summing spectrum components that match a full single-BW approach may not be linear, in particular when processing is pushing the technology envelope, which has been inherently the situation recently in the competitive environment of broadband evolution. Existing solutions do not make use of bandpass sampling in the area of digital return; in particular, the disclosed techniques for using bandpass sampling, a digital signal processing technique, to enable flexible selection of critical system parameters including bandwidth, and center frequency location, have not been contemplated. Dynamic selection of these critical system parameters enables both efficient transmission of CATV upstream paying services and avoidance of upstream impairments including ingress and laser clipping.

Figure 6:
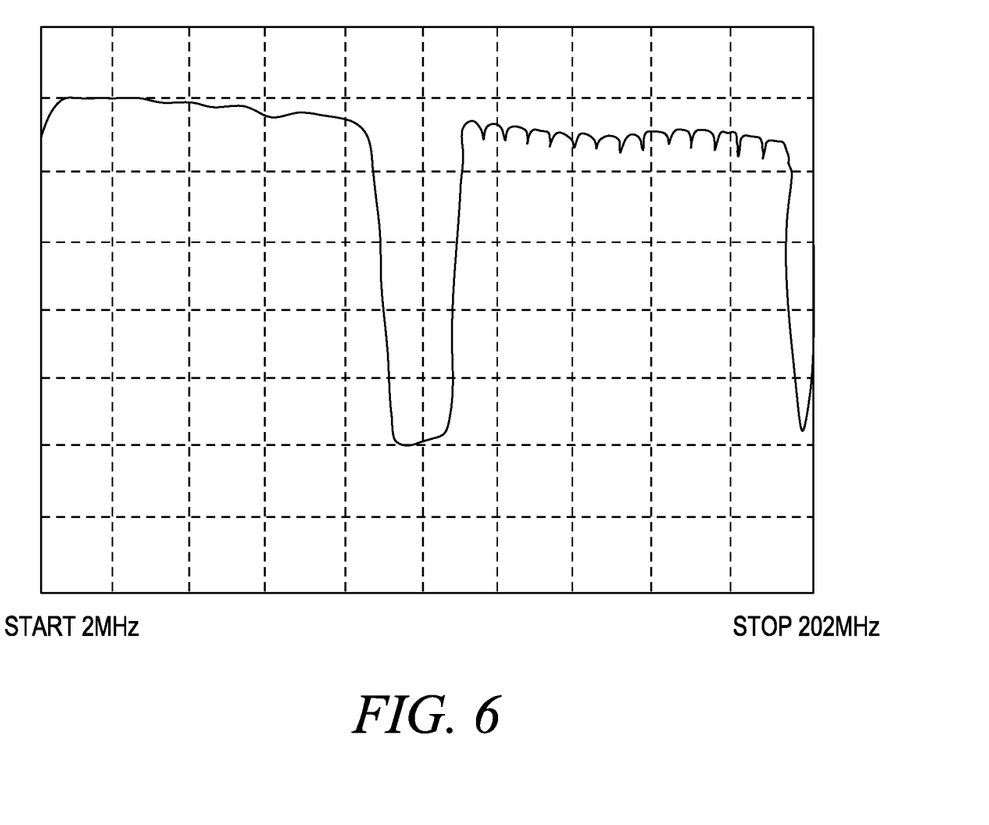
FIG. 6 shows a brassboard DRR output spectrum using existing 2×85 Digital Return Transmitter (DRT) and Digital Return Receiver (DRR) systems.

FIG. 6 depicts a brassboard DRR output spectrum using existing 2×85 DRT and DRR boards. In this example, 85 MHz analog lowpass filters in DRT and DRR are bypassed in one of the TDM channels. Analog amps currently used have decreasing gain from 85 to 200 MHz and therefore the passband slope and ripple may be further optimized. Sampling and processing rate has not been bumped, in this example, still running at a rate of 202 Msps. Due to keeping rate at 202 Msps, in this embodiment, two ~80 MHz BW channels are used rather than two (2) 96 MHz channels. In this embodiment, the lower channel is 5-85 MHz and the upper channel is 113-197 MHz. An 80 MHz noise block to simulate lower wideband channel and fourteen 256QAMs is used to simulate upper wideband channel. Signals are being passed with respectable SNR and distortions but MER at higher frequencies is being limited by phase jitter.

In embodiments, phase jitter and phase noise requirements are determined for the clocks to support 42+dB MER at the upper end of the band, which may dictate hardware design choices to meet the phase jitter requirements. Further, analog amps and filters may be designed to support upper wideband channel and optimize passband response. In embodiments where the sampling rates are bumped from 202 to 232 MHz, the phase jitter and phase noise requirements may be determined. The DRT and DRR boards may be configured to deliver >42 dB MER at high end of band.

Figure 7:
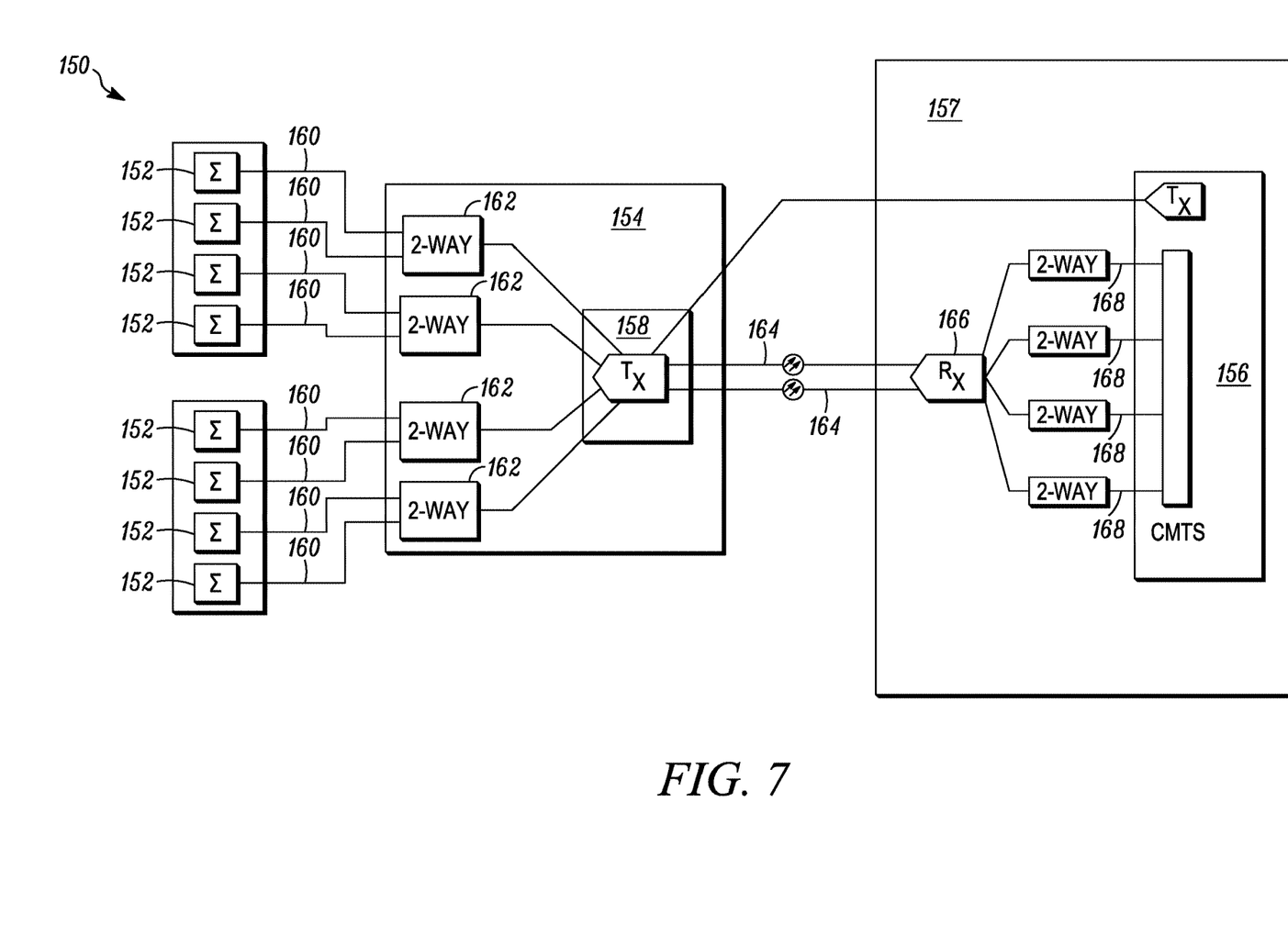
FIG. 7 shows an exemplary architecture including the system shown in FIG. 1.

FIG. 7 depicts an exemplary architecture 150 by which data may be transmitted along a return path between a plurality of end user cable modems 152 and a CMTS 156 in a head end 157, through a node 154. In this architecture, a DRT 158 in the node receives respective signals from each of the modems 152 via an array of coaxial cables 160. The coaxial cables may be connected to modems 152 using two-way splitters used as combiners 162 such that a respective two-way splitter 162 propagates signals onto a coaxial cable 160 from a pair of modems 152. The transmitter 158 is preferably configured as shown in FIG. 4, and propagates a digital signal onto a fiber optic transmission line 164 at two wavelengths, and which is carried to a receiver 166 that is also preferably configured as shown in FIG. 4. After converting the incoming digital signals to respective analog RF signals, the receiver 166 may convey them to the CMTS 156 using coaxial cables 168 and two-way splitters 170.

It should be understood that, although FIG. 4 only shows an architecture for providing data along an upstream path from the cable modems 152 to the CMTS 156, such an architecture also includes equipment to provide data along the forward path from the CMTS 156 to the node 145 and on to the cable modems 152.

Figure 8:
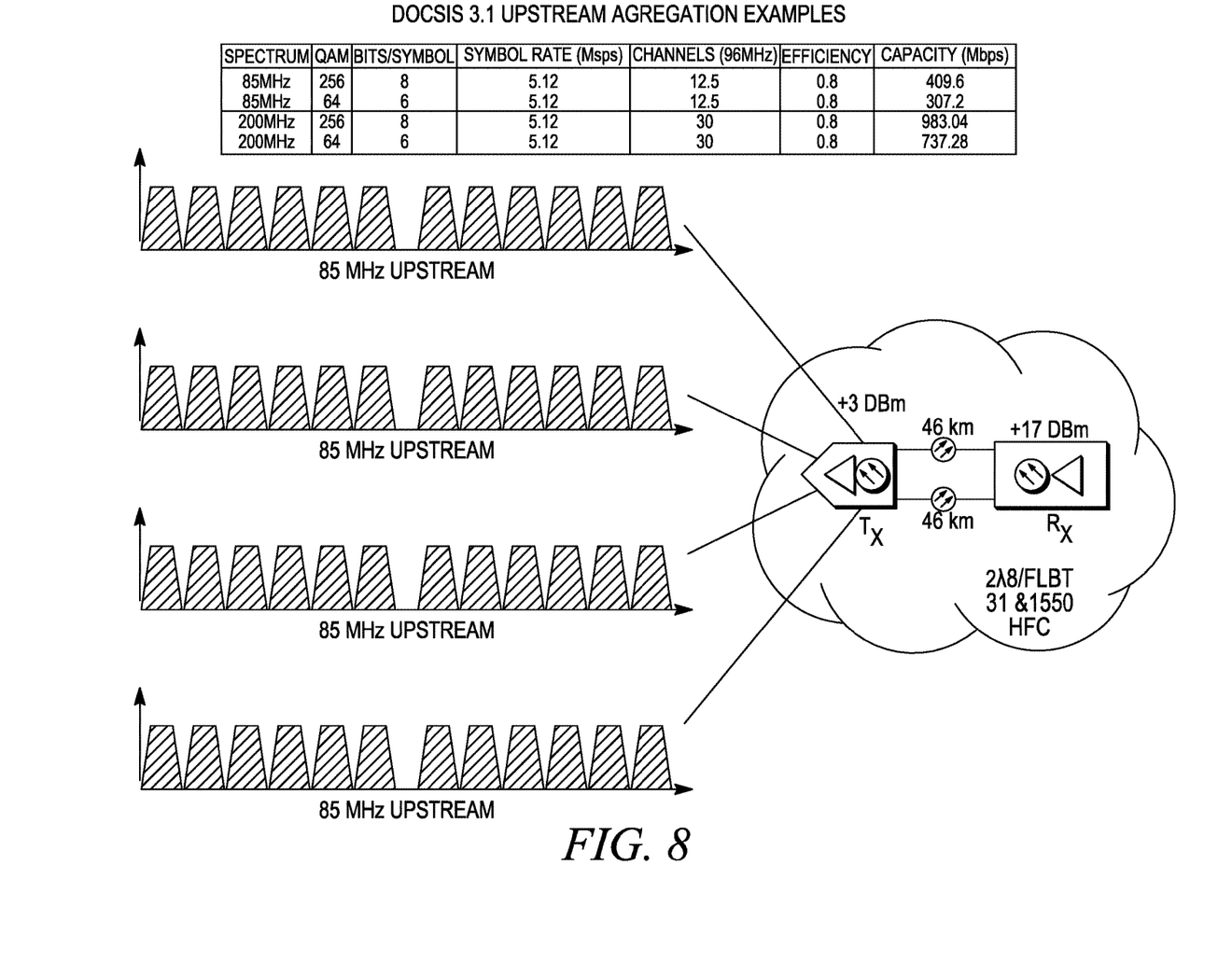
FIGS. 8 and 9 each show respective examples of DOCSIS 3.0 capacity aggregation in a node.

FIG. 8 shows estimates in a system similar to that of FIG. 6, but without using the bandpass filter 112 of FIG. 4. In this example, data is delivered along an upstream path to the node by a coaxial cable carrying 85 MHz blocks of data. In this example, the throughput or capacity at the node was estimated to range from approximately 307 Mbps to 983 Mbps depending on the number of channels and/or the depth of modulation, e.g. 64 QAM versus 256 QAM.

Figure 9:
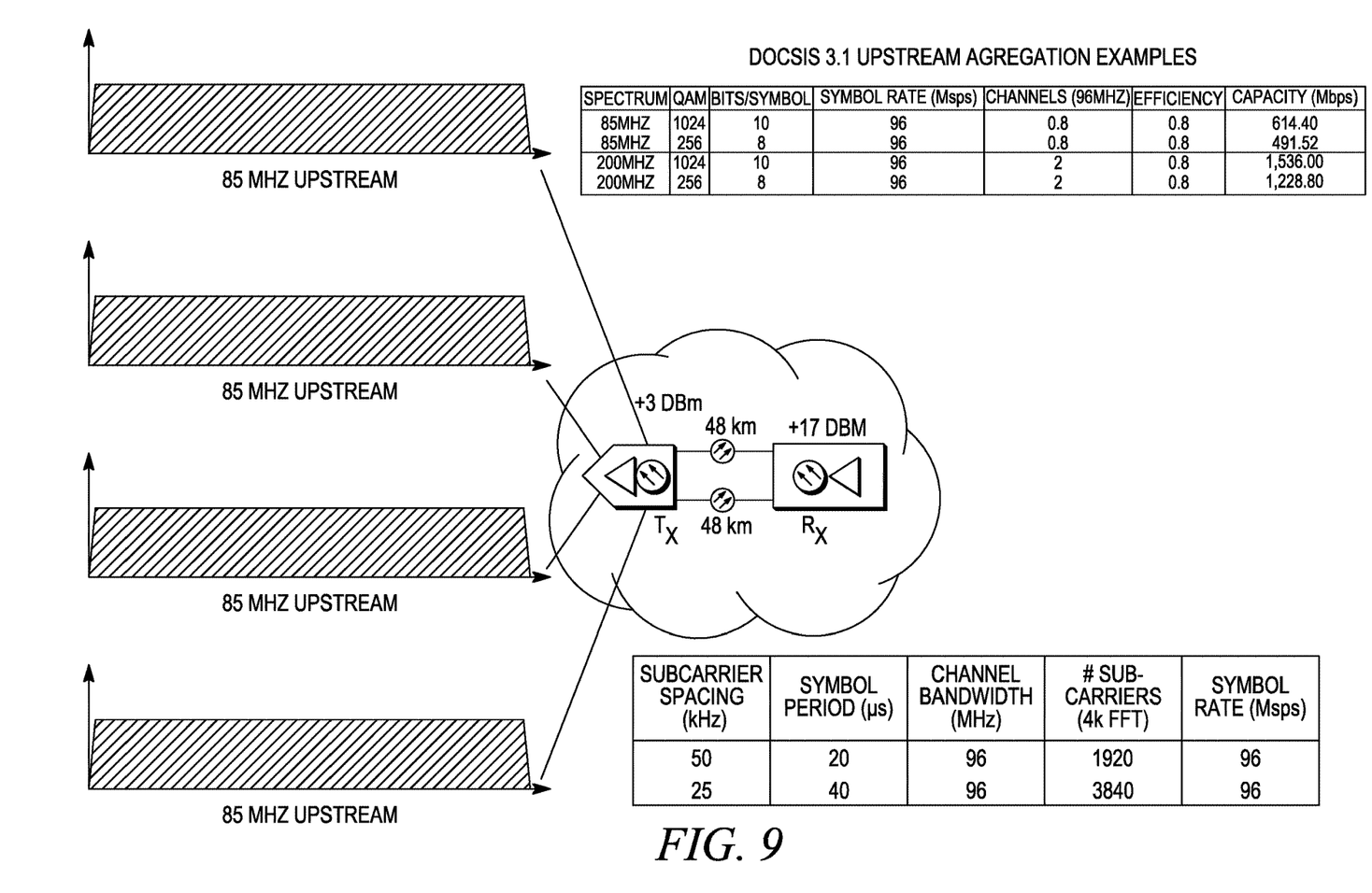

FIG. 9 shows estimates in a system similar to that of FIG. 6, but instead using the bandpass filter 112 of FIG. 4, under several channel conditions presumed to be consistent with the upcoming DOCSIS 3.1 standard, e.g. up to 1024 QAM while still using 85 MHz blocks. In this example, the throughput or capacity at the node was measured to range from approximately 491 Mbps to 1,536 Mbps depending on the number of channels and/or the depth of modulation, e.g. 256 QAM versus 1024 QAM. As can be seen from a comparison between FIGS. 8 and 9, the use of a bandpass filter and bandpass sampling as disclosed in the present application approximately doubles the upstream throughput in a CATV transmission system using lower complexity hardware.

In some embodiments, the disclosed techniques may be implemented via an incremental complexity addition to a current digital return product, e.g., an >85 MHz digital return product. Incremental complexity addition to existing products may enable upgrades, e.g., >85 MHz CATV upstream upgrades, at an incremental cost to cable system operators, thereby avoiding the use of more expensive analog-to-digital converters (ADCs) associated with sampling equivalent frequency ranges. In an example digital return device, real estate in the node housing of an SG4 optical hub would enable cable operators to easily aggregate capacities as high as 6 GB per node as needed.

The disclosed techniques provide flexibility to support dynamic center frequency locations. The ability to support dynamic center frequency locations may allow cable operators the flexibility to focus optical link transmission on paying services, rather than the traditional approach of transmitting both paying services plus ingress.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the claimed subject matter is defined and limited only by the claims that follow.

The invention claimed is:

1. A method for sending a signal on an upstream path in a CATV network, the method comprising:
   receiving an input electrical signal comprising upstream data from at least one cable modem of a CATV consumer;
   combining the input signal to form a single continuous upstream spectrum including a plurality of channels including at least a first wideband orthogonal frequency division multiple access (OFDM) channel bounded by the lowest frequency in the continuous upstream spectrum and a second wideband OFDM channel bounded by the highest frequency value of the continuous upstream spectrum;
   sampling and digitizing only a selective portion of the continuous upstream spectrum, the selective portion including the first OFDM channel and the second OFDM channel;
   converting the digitized signal to an optical signal; and
   sending the optical signal to a CMTS in a head end of the CATV network.

2. The method of claim 1 where the signal on an upstream path is sent at a throughput exceeding 1 Gbps.

3. The method of claim 1 where the signal on an upstream path is sent at 1024 QAM.

4. The method of claim 1 having a guardband located on the continuous upstream spectrum between the first OFDM channel and the second OFDM channel, the guardband not sampled and digitized.

5. The method of claim 1 including amplifying both the first OFDM channel and the second OFDM channel.

6. The method of claim 1 where the selective portion is sampled and digitized at a rate at least equal to the Nyquist rate.

7. The method of claim 1 where all information in the continuous upstream spectrum is retained.

8. The method of claim 1 including at least one bandpass filter configured to exclude guardbands within the continuous upstream spectrum from being sampled.

* * * * *